United States Patent [19]

Sautter et al.

[11] 4,453,733
[45] Jun. 12, 1984

[54] SUSPENSION SYSTEM WITH CONTROL FOR THE TOE-IN OF NON-STEERED WHEELS

[75] Inventors: Wolfgang Sautter, Grafelfing; Rudolf Muller, Dachau, both of Fed. Rep. of Germany

[73] Assignee: Bayerische Motoren Werke A.G., Fed. Rep. of Germany

[21] Appl. No.: 321,565

[22] Filed: Nov. 16, 1981

[30] Foreign Application Priority Data

Nov. 14, 1980 [DE] Fed. Rep. of Germany ....... 3043092

[51] Int. Cl.³ .............................................. B62D 17/00
[52] U.S. Cl. .................................... 280/661; 280/95 R
[58] Field of Search ..................... 280/690, 661, 95 R, 280/668

[56] References Cited

U.S. PATENT DOCUMENTS

| 1,822,159 | 9/1931 | Masury | 280/690 |
| 2,193,137 | 3/1940 | Leighton | 280/690 |
| 3,866,938 | 2/1975 | Boyd | 280/661 |
| 4,213,631 | 7/1980 | Wilkerson | 280/661 |

Primary Examiner—Richard A. Bertsch

Attorney, Agent, or Firm—Craig & Burns

[57] ABSTRACT

An individual wheel suspension is disclosed for a non-steered wheel of a motor vehicle such as an automobile which undergoes a change in camber by spring travel. The individual wheel suspension comprises a trailing arm which is articulated in the direction transverse to the lengthwise axis of the vehicle by at least one wishbone and connected in the lengthwise direction of the vehicle to the vehicle body via a lengthwise arm with a swivel bearing having a swivel axis which lies essentially in the direction transverse to the lengthwise axis of the vehicle, and an auxiliary device which engages the lengthwise arm at a distance from the swivel axis and by means of which the lengthwise arm is pivoted in the direction transverse the lengthwise axis of the vehicle along the swivel axis as the wheel goes up and down. The wheel suspension is characterized in that the auxiliary device engages the lengthwise arm in the vicinity of the swivel bearing-in design position of the vehicle at a vertical distance from a swivel axis whereby the auxiliary device can influence the toe-in on the wheel as it goes up and down with low construction costs and small space requirements.

12 Claims, 4 Drawing Figures

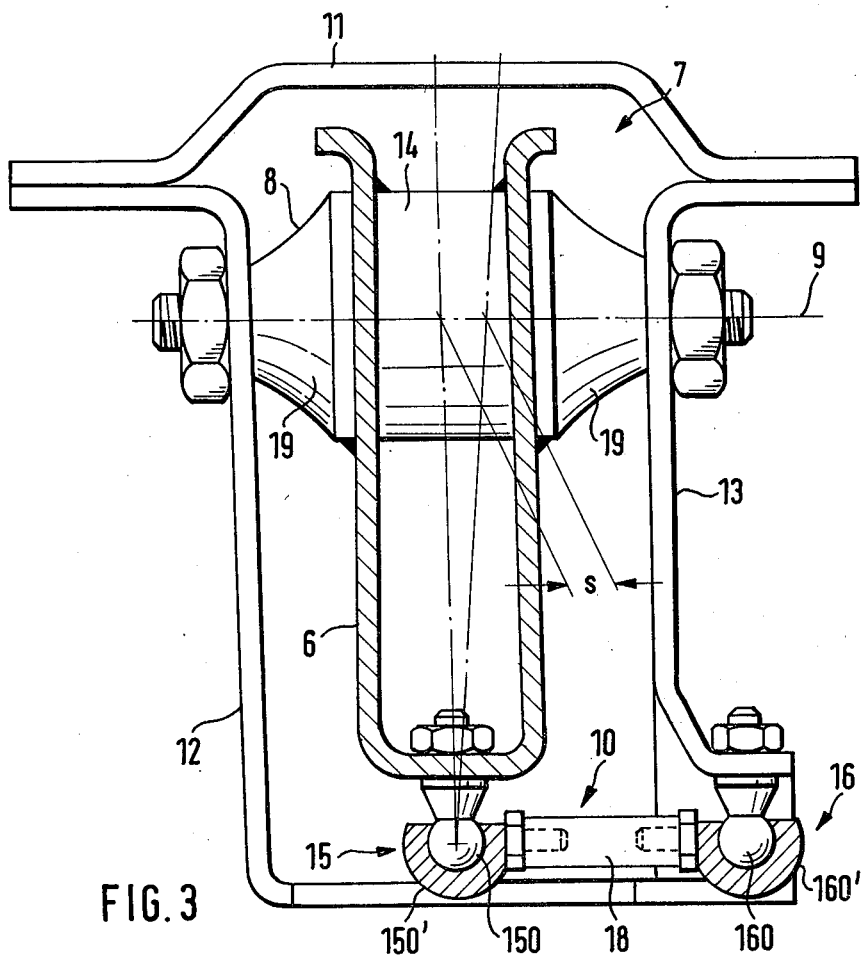

SUSPENSION SYSTEM WITH CONTROL FOR THE TOE-IN OF NON-STEERED WHEELS

BACKGROUND OF THE INVENTION

The present invention relates to an individual wheel suspension for a non-steered wheel of a motor vehicle such as an automobile which undergoes a change in camber due to spring travel. The suspension includes a trailing arm which is articulated in the direction transverse to the lengthwise axis of the vehicle by at least one wishbone and connected in the lengthwise direction of the vehicle to the vehicle body via a torsion-proof lengthwise arm with a swivel bearing having a swivel axis which lies essentially in the direction transverse to the lengthwise axis of the vehicle. An auxiliary device engages the lengthwise arm at a distance from the swivel axis by means which the lengthwise arm is pivoted in the direction transverse to the lengthwise axis of the vehicle along the swivel axis as the wheel goes up and down.

An individual wheel suspension of this type is known to be used for the powered rear axle of a production motor vehicle, and is shown, for example, in the journal "Automotive Industries," Sept. 15, 1964, page 82. In this known axle, an auxiliary tie rod, extending in a direction transverse to the lengthwise axis of the vehicle, engages each lengthwise arm between the corresponding wishbones and the corresponding swivel bearing. Each auxiliary tie rod engages the lengthwise arm at an essentially horizontal distance from the corresponding swivel axis, and extends approximately to the central area of the vehicle. The auxiliary tie rods produce a displacement of the corresponding lengthwise arm in the swivel bearing along the swivel axis to achieve a desired effect on the toe-in behavior on a wheel as it rises and falls through the swiveling movements of the lengthwise arm.

A disadvantage of this known auxiliary tie rod arrangement, in addition to the structural expense, is the additional space requirements for the auxiliary tie rods.

SUMMARY AND OBJECTS OF THE INVENTION

An object of the invention is to provide an individual wheel suspension of the aforementioned type including an auxiliary device to influence the toe-in on the wheel as it goes up and down with low construction cost and small space requirements.

This and other objects of the invention are achieved by providing an individual wheel suspension for a non-steered wheel of a motor vehicle, such as an automobile, of the type referred to above which is characterized in that the auxiliary device engages the lengthwise arm in the vicinity of the swivel bearing in the structural position of the vehicle at a vertical distance from the swivel axis.

By comparison with the state of the art as initially described, whereby the displacement of the lengthwise arm in its swivel bearing is effected in the direction transverse to the lengthwise axis of the vehicle, by the swiveling movements of the lengthwise arm and the auxiliary tie rods in planes which are approximately at right angles to one another, in the invention a rocking movement of the lengthwise arm about its lengthwise axis is used as the basis for the lengthwise arm displacement for influencing the toe-in behavior. The lengthwise arm of the individual wheel suspension described at the outset undergoes this rocking movement when the wheel undergoes a change in camber during spring travel.

With the auxiliary device associated with the lengthwise arm in the vicinity of the swivel bearing according to the invention, a rocking point is provided outside the swivel axis for the lengthwise arm, around which point the torsion-proof lengthwise arm rocks with swiveling movements during the spring excursions. The rocking point is located outside the swivel axis so that the lengthwise arm is shifted or displaced in the swivel bearing.

A preferred embodiment of the invention is achieved by providing that the auxiliary device engages the lengthwise arm at a vertical distance below the swivel axis. Further, the swivel bearing is formed in a bracket connectable with the vehicle body. The auxiliary device is disposed in the bracket and is equipped as a strut with ball joints, one of which is mounted on the bracket and the other on the lengthwise arm. Such an arrangement provides the advantages of minimum construction cost and minimum space requirements. In this way, an additional installation space, especially for a fuel tank, is obtained in a space which is formed by the wishbones or wheel axles of a motor-vehicle axle between the lengthwise arm.

In addition, the compactly designed auxiliary device according to the invention can be equipped with means for adjusting the length of the device to adjust the static camber.

These and other objects, features and advantages of the present invention will become more apparent from the following description when taken in connection with the accompanying drawings, which show, for purposes of illustration only, one embodiment in accordance with the present invention.

BRIEF DESCRIPTION OF THE DRAWINGS

FIG. 3 shows the bracket with auxiliary tie rods and lengthwise arm in cross section along line III—III in FIG. 2.

DESCRIPTION OF THE PREFERRED EMBODIMENTS

Figure 1:
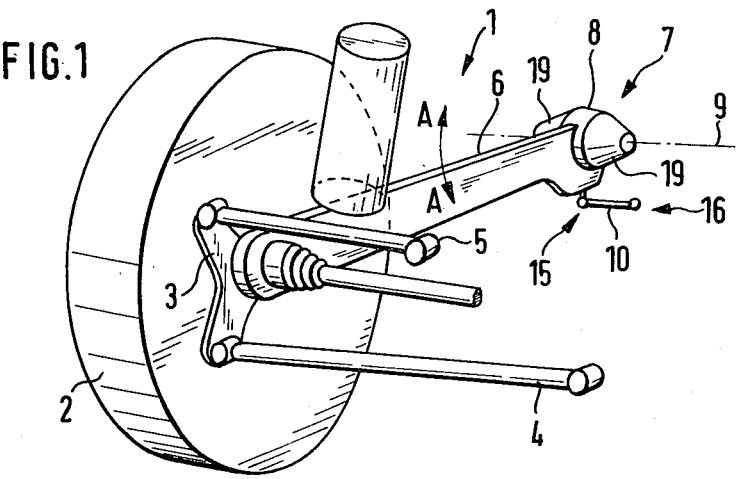
FIG. 1 shows an individual wheel suspension of the invention with auxiliary tie rods located below the lengthwise arm swivel axis.

A powered or nonpowered wheel 2 is mounted by an individual wheel suspension 1 of a rear axle of an automobile, not shown in greater detail, on a trailing arm 3. The arm 3 is articulated on the vehicle body, not shown, in the direction transverse to the lengthwise axis of the vehicle by means of two wishbones 4 and 5 of different lengths, one located above the other, for a predetermined pattern of changes in camber. In addition, trailing arm 3 is rigidly connected to a lengthwise arm 6 which is torsion-proof and extends in the lengthwise direction of the vehicle. The lengthwise arm is articulated by a swivel bearing 7 to the vehicle body. Swivel bearing 7 comprises a rubber and metal element designed as a turn and slide spring 8 whereby swivel axis 9 of turn and slide spring 8 runs essentially in the direction transverse to the vehicle.

In the vicinity of swivel bearing 7 or turn and slide spring 8, a strut 10 engages lengthwise arm 6 on the road side at a vertical distance below swivel axis 9, viewed from an end of the vehicle.

Figure 2:
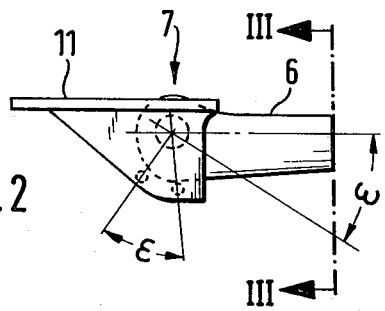
FIG. 2 shows a bracket for the swivel bearing of the lengthwise arm.

As can be seen from FIGS. 2 and 3, swivel bearing 7 is formed in a bracket 11, connectable with the vehicle body. The turn and slide spring 8 is disposed between legs 12 and 13 of bracket 11. Turn and slide spring 8 is nonrotatably connected with lengthwise arm 6 by its outer sleeve 14. A ball joint 15 with a ball pivot 150 is disposed below swivel axis 9 on lengthwise arm 6 in a cutout on the road side of the bracket. Ball joint 16 cooperates with strut 10 which is articulated by an additional ball joint 16, with a ball pivot 160, on leg 13 of bracket 11.

Strut 10 comprises a tubular strut 18, in whose end areas ball joint sockets 150' and 160' are disposed by means of threaded studs. Left-hand and right-hand threads on the respective threaded studs provide a length-adjusting device on strut 18 for adjusting the static toe-in of wheel 2.

Strut 10, which engages lengthwise arm 6 vertically below swivel axis 9 in the vicinity of swivel bearing 7, produces a rocking point for lengthwise arm 6 which lies outside swivel axis 9 in ball joint 15, about which the torsion-proof lengthwise arm 6 rocks during swivel movements along arrow A—A during the flexing of the spring, resulting in a displacement or shifting "s" of lengthwise arm 6 is swivel bearing 7 (see FIG. 3). The displacement of lengthwise arm 6 in swivel bearing 7, which is effected for the desired influence of wheel 2 upon toe-in as the wheel goes up and down through the camber pattern, is taken up in turn is accomodated in slide spring 8 by rubber-elastic part 19.

Figure 4:
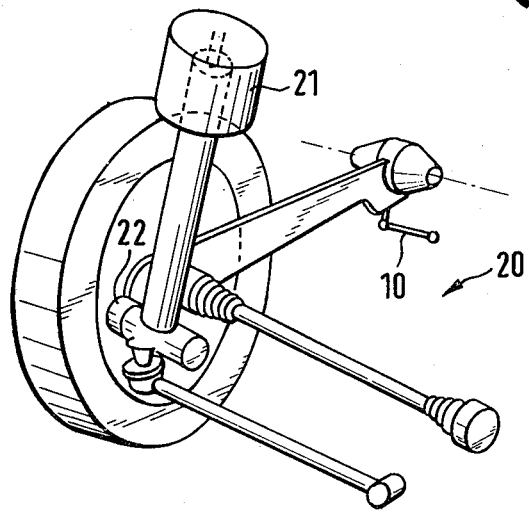
FIG. 4 shows an individual wheel suspension with a strut.

FIG. 4 shows the auxiliary device described above for an individual wheel suspension 20, whereby a strut 21 is disposed instead of wishbone 5 in wheel suspension 1 as shown in FIG. 1 and is articulated with a trailing arm 22. The positioning and relationship of the strut 10 in this type of suspension is the same as indicated for the suspension system described above.

While we have shown and described only one embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. A single-wheel suspension for non-steered wheels of motor vehicles, especially passenger vehicles, which during the spring action have a change of camber, with said single-wheel suspension having a wheel support which, in the transverse direction of the vehicle in the area of the wheel axle, via a camber-changing transverse guidance, in the longitudinal direction of the vehicle, via a torsion-proof longitudinal arm, is movably connected with the body of the vehicle, and where an auxiliary device is applied at the longitudinal arm, at a distance from the pivot bearing of the longitudinal arm on the side of the vehicle body, in such a way that the longitudinal arm, during the bending and unbending of the wheel springs, is forcibly dislocated in the pivot bearing approximately in the transverse direction of the vehicle for the purpose of influencing the toe-in, characterized in that the auxiliary device, in the area of the pivot bearing at a vertical distance from the swivel axis, is movably connected with the longitudinal arm in such a way that the longitudinal arm, during the bending and unbending of the springs for the wheel, by means of the camber-changing transverse guidance in the movable connection, is tilted relative to the swivel axis by means of the auxiliary device.

2. The single-wheel suspension according to claim 1, characterized in that the auxiliary device engages the longitudinal arm at a vertical distance below the swivel axis.

3. The single-wheel suspension according to claim 2, wherein the swivel bearing is formed in a bracket connectable with the vehicle body, characterized in that the auxiliary device is disposed in the bracket and is equipped as a strut with a pair of ball joints, one of which is mounted on the bracket and the other on the lengthwise arm.

4. The single-wheel suspension according to claim 3, characterized in that said strut comprises means for adjusting the length of the device.

5. The single-wheel suspension according to claims 1, 2, 3 or 4, characterized in that the swivel bearing comprises a rubber and metal element as a turn and slide spring.

6. The single-wheel suspension accordin to claim 1, characterized in that one of a shock absorber and a strut engages the trailing arm in an articulated fashion for additional transverse articulaton.

7. A suspension system for independently suspended wheels of motor vehicles, comprising a torsion resistant trailing arm means extending generally in the longitudinal direction of the vehicle for positioning a wheel, spring means allowing upward and downward movement of the wheel relative to a body portion of the vehicle, and strut means interconnecting a substantially rigid support to said trailing arm means at a point spaced vertically from a point of attachment of the trailing arm means to said body portion, bearing means allowing movement of an associated end of the trailing arm means in a direction generally transverse to the longitudinal direction of the vehicle for attaching said trailing arm means to said body portion, wherein toe-in of said wheel is controlled in a predetermined manner during upward and downward movement of the wheel by said strut means acting on said trailing arm means.

8. The suspension system according to claim 7, wherein the strut means engages the trailing arm means at a vertical distance below a swivel axis determined by said bearing means.

9. The suspension system according to claim 8, wherein the bearing means is formed in a bracket connectable with the vehicle body portion, said strut means is disposed in said bracket and includes a strut with a ball joint at either end thereof, one end of said strut is connected to the bracket and the other end of the strut is connected to the trailing arm means.

10. The suspension system according to claim 9, wherein said strut includes means for adjusting the length of the strut.

11. The suspension system according to claim 7, wherein the bearing means includes an elastomeric portion and a metal portion cooperating to form a turn and slide spring.

12. The suspension system according to claim 7, wherein one of a shock absorber and a suspension strut engages the trailing arm means in an articulated fashion for additional transverse articulation.

* * * * *